United States Patent
Jagannathan et al.

(10) Patent No.: US 11,243,986 B1
(45) Date of Patent: Feb. 8, 2022

(54) METHOD FOR PROACTIVE TROUBLE-SHOOTING OF PROVISIONING WORKFLOWS FOR EFFICIENT CLOUD OPERATIONS

(71) Applicant: INTERNATIONAL BUSINESS MACHINES CORPORATION, Armonk, NY (US)

(72) Inventors: Anupama Jagannathan, Cedar Park, TX (US); Karthick Rajamani, Austin, TX (US); Anne Elizabeth Gattiker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 72 days.

(21) Appl. No.: 16/935,119

(22) Filed: Jul. 21, 2020

(51) Int. Cl.
  *G06F 16/28* (2019.01)
  *G06F 16/23* (2019.01)

(52) U.S. Cl.
  CPC ........ *G06F 16/285* (2019.01); *G06F 16/2379* (2019.01)

(58) Field of Classification Search
  USPC ........................................................ 707/737
  See application file for complete search history.

(56) References Cited

U.S. PATENT DOCUMENTS

| | | | |
|---|---|---|---|
| 9,202,178 B2* | 12/2015 | Hall | G06N 3/088 |
| 9,652,354 B2 | 5/2017 | Vitaly et al. | |
| 10,037,689 B2* | 7/2018 | Taylor | G06K 7/10475 |
| 10,113,233 B2 | 10/2018 | Chang | |
| 10,418,811 B2* | 9/2019 | Konya | H02J 13/0006 |
| 11,080,336 B2* | 8/2021 | Van Dusen | G06Q 50/01 |
| 2017/0249200 A1 | 8/2017 | Mustafi et al. | |
| 2019/0243743 A1* | 8/2019 | Saxena | G06F 11/0766 |
| 2020/0285997 A1* | 9/2020 | Bhattacharyya | G06N 20/00 |

FOREIGN PATENT DOCUMENTS

| | | |
|---|---|---|
| CN | 104090861 A | 10/2014 |
| CN | 108475287 A | 8/2018 |
| CN | 109800713 A | 5/2019 |

OTHER PUBLICATIONS

Foreign communication from a counterpart application, PCT Application PCT/CN2021/101264 filed Jun. 21, 2021, International Search Report and Written Opinion dated Sep. 26, 2021, 10 pages.

(Continued)

*Primary Examiner* — Cam Linh T Nguyen
(74) *Attorney, Agent, or Firm* — Conley Rose, P.C.

(57) ABSTRACT

A method for determining an intervention response category for provisioning workflows. The method determines provisioning features of a provisioning step. The method performs outlier detection to identify and remove outliers from non-intervention data to produce a non-intervention normal data set. The method performs iterative grouping on the non-intervention normal data set to determine significant variables in the provisioning features. The method performs response mapping of provisions using results of the iterative grouping including a significance of errors and a presence of errors in the non-intervention normal data and partial intervention data to categorize the provisions into a response category.

20 Claims, 10 Drawing Sheets

(56) References Cited

OTHER PUBLICATIONS

Tak, et al., "Priolog: Mning Important Logs via Temporal Analysis and Prioritization," MDPI, Sustainability 2019, 11 6306, 17 pages.
Du, et al., "DeepLog: Anomaly Detection and Diagnosis from System Logs through Deep Learning," CCS'17, Oct. 30-Nov. 3, 2017, Dallas, TX, USA © 2017 ACM. ISBN 978-1-4503-4946—Aug. 17, 2010, 14 pages.
Moghaddam, "Anomaly-aware Management of Cloud Computing Resources," Thesis, Jul. 2019, 238 pages.
Pouchard, et al., "Prescriptive Provenance for Streaming Analysis of Workflows at Scale," Brookhaven National aboratory, BNL-212071-2019-COPR, USDOE Office of Science (SC), Basic Energy Sciences (BES) (SC-22), Aug. 6-8, 2018, 8 pages.
Alnafessah, et al., "Artificial Neural Networks Based Techniques for Anomaly Detection in Apache Spark," Cluster Computing, https://doi.org/10.1007/s10586-019-02998-y, published Oct. 23, 2019, 16 pages.
Debnath, et al., "LogLens: A Real-time Log Analysis System," 2018 IEEE 38th International Conference on Distributed Computing Systems (ICDCS), IEEE, 2018, pp. 1052-1062.
Xu, et al., "Detecting Large-scale System Problems by Mining Console Logs," Proceedings of the ACM SIGOPS 22nd Symposium on Operating Systems Principles, ACM, 2009, 15 pages.
Breier, et al., "Anomaly Detection from Log Files Using Data Mining Techniques," Information Science and Applications, Springe, Berlin, Heidelberg, 2015, pp. 449-457.
Yu, et al., "Cloudseer: Workflow Monitoring of Cloud Infrastructures via Interleaved Logs," ACM SIGPLAN Notices, vol. 51, No. 4, ACM, 2016, 14 pages.
Meng, et al., "Driftinsight: Detecting Anomalous Behaviors in Large-scale Cloud Platform," 2017 IEEE 10th International Conference on Cloud Computing, pp. 230-237.
Nagaraj, et al., "Structured Comparative Analysis of Systems Logs to Diagnose Performance Problems," NSDI, 2012, 14 pages.
"List of IBM Patents or Patent Applications Treated as Related," Jul. 21, 2020, 2 pages.
Xu, et al., "Detecting Large-Scale System Problems by Mining Console Logs," SOSP'09, Oct. 11-14, 2009, pp. 117-131.

* cited by examiner

300

| 302 | 304 | 306 | | | | | 308 | 310 |
|---|---|---|---|---|---|---|---|---|
| PROV ID | STEP DURATION (IN SECS) $st_i$ | IMAGE TYPE | OS TYPE | DISK CAPACITY | # OF CPUs | RAM SIZE | ERROR MESSAGE (AFTER REMOVING ANY PROVISION SPECIFIC INFO) | ENCODED_ERROR (CATEGORICAL ENCODING OF ERROR MESSAGE) |
| PID1 | 900 | CUSTOM | UBUNTU | 100 GB | 2 | 4096 | [ERROR] MAXIMUM TIMEOUT WAS EXCEEDED WHILE CHECKING CONSOLE OUTPUT [DEVICE DEVICEID...] | 1 |
| PID2 | 70 | CUSTOM | UBUNTU | 100 GB | 4 | 8192 | NO ERROR | 0 |
| PID3 | 350 | CUSTOM | CENTOS | 25 GB | 1 | 1024 | [ERROR] FAILED TO OPEN CONNECTION [DEVICE DEVICEID...] | 2 |

PROVISION PARAMETERS$_i$     TEMPLATED ERROR$_i$     ENCODED ERROR$_i$

*FIG. 3*

\* ERROR IS SIGNIFICANT AND ERROR PRESENT IN INTERVENTION DATA + NON INTERVENTION NORMAL DATA → DELAYED ATTENTION

\*\* ERROR PRESENT IN NON -INTERVENTION NORMAL DATA BUT NOT IN PARTIAL INTERVENTION DATA → NO ATTENTION

800

\*\*\* ERROR PRESENT IN INTERVENTION DATA ONLY → IMMEDIATE ATTENTION

| ENCODED ERROR | ENCODED IMAGE TEMPLATE TYPE | ENCODED OS TYPE | DURATION THRESHOLD | TIME TO ALARM THRESHOLD | |
|---|---|---|---|---|---|
| 0 | 0 | NA | 123.53 | 363.5 | |
| 0 | 1 | NA | 363.5 | 363.5 | |
| 3 | 0 | 0 | 200.0 | 363.5 | \* |
| 3 | 0 | 1 | 230.0 | 363.5 | |
| 3 | 1 | NA | 185.0 | 363.5 | |
| 1 | 0 | NA | 63.07 | NULL | \*\* |
| 1 | 1 | NA | 63.07 | NULL | |
| 2 | | | | 0 | \*\*\* |

*FIG. 8*

| PROVISIONING STEP | #PROVISIONS | TRUE POSITIVE RATE (%) (RECALL) | POSITIVE PREDICTIVE VALUE (%) (PRECISION) |
|---|---|---|---|
| STEP1 | 231,013 | 95.22 | 99.52 |
| STEP2 | 151,815 | 97.99 | 100 |
| STEP3 | 230,952 | 91.17 | 100 |
| STEP4 | 217,892 | 99.99 | 100 |

*FIG. 9*

METHOD FOR PROACTIVE TROUBLE-SHOOTING OF PROVISIONING WORKFLOWS FOR EFFICIENT CLOUD OPERATIONS

BACKGROUND

Provisioning a virtual machine or baremetal server in the cloud involves a number of provisioning steps during which unstructured, timestamped logs are generated as the workflow progresses through the provisioning steps and reflect the provisioning status. Of approximately tens of thousands of virtual server infrastructure (VSI) provisions that happen per day, a few hundred provisions can end up in a stuck state during a given provisioning step. Proactive detection and remediation of overdue provisions generally involves having to manually identify the error causing the provision to be in the stuck state, which can be a significant performance bottleneck. Additionally, not all overdue transactions require manual attention because of their ability to self-resolve. Current methods of anomaly detection do not provide guidance on when to intervene.

SUMMARY

The disclosed embodiments include a system, method and computer program product configured to determine an intervention response category for provisioning workflows. In an embodiment, the system, method and computer program product is configured to determine provisioning features of a provisioning step; perform outlier detection to identify and remove outliers from non-intervention data to produce a non-intervention normal data set; perform iterative grouping on the non-intervention normal data set to determine significant variables in the provisioning features; and perform response mapping of provisions using results of the iterative grouping including a significance of errors and a presence of errors in the non-intervention normal data and partial intervention data to categorize the provisions into a response category.

Optionally, in some embodiments, the response category is one of immediate attention, delayed attention, and no attention.

Optionally, in some embodiments, the system, method, and computer program product uses local outlier factor (LOF) to identify the outliers in the non-intervention data.

Optionally, in some embodiments, the system, method, and computer program product is configured to compute a step duration for the provisioning step for all the provisions using event logs associated with the provisioning step; identify provisioning parameters of the provisioning step; and identify error messages in the event logs that occur as part of the provisions in the provisioning step.

Optionally, in some embodiments, the system, method, and computer program product is configured to compute F statistic values based on the provisioning parameters, the error messages, and the step duration; determine significant variables based on the F statistic values; cluster the non-intervention normal data set into a plurality of clusters based on a combination of values of the significant variables Optionally, in some embodiments, the system, method, and computer program product is configured to compare a percentage of datapoints exceeding an n*an interquartile range to a threshold for each cluster to determine whether the cluster is a candidate for further splitting, wherein n is variable.

Optionally, in some embodiments, the system, method, and computer program product is configured to compute a duration threshold for each cluster by computing n*an interquartile range for each cluster, wherein n is variable.

Optionally, in some embodiments, the system, method, and computer program product is configured to categorize the response category as delayed attention when an error is present in the partial intervention data and in the non-intervention normal data set and the error is a significant variable as a result of iterative grouping.

Optionally, in some embodiments, the system, method, and computer program product is configured to compute a time to alarm for an error, where a time to alarm for the error is a maximum of all duration threshold values across all clusters with a non-zero and non-NULL duration threshold.

Optionally, in some embodiments, the system, method, and computer program product is configured to categorize the response category as immediate attention when an error is present in the partial intervention data and not in the non-intervention normal data set.

Optionally, in some embodiments, the system, method, and computer program product is configured to categorize the response category as no attention when an error is present in the non-intervention normal data set and not in the partial intervention data.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a chart illustrating provisioning features in accordance with an embodiment of the present disclosure.

FIG. 8 is a chart illustrating time to alarm thresholds for significant variables in accordance with an embodiment of the present disclosure.

FIG. 9 is a chart illustrating results of training and test data from disjoint time periods in accordance with an embodiment of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Figure 1:
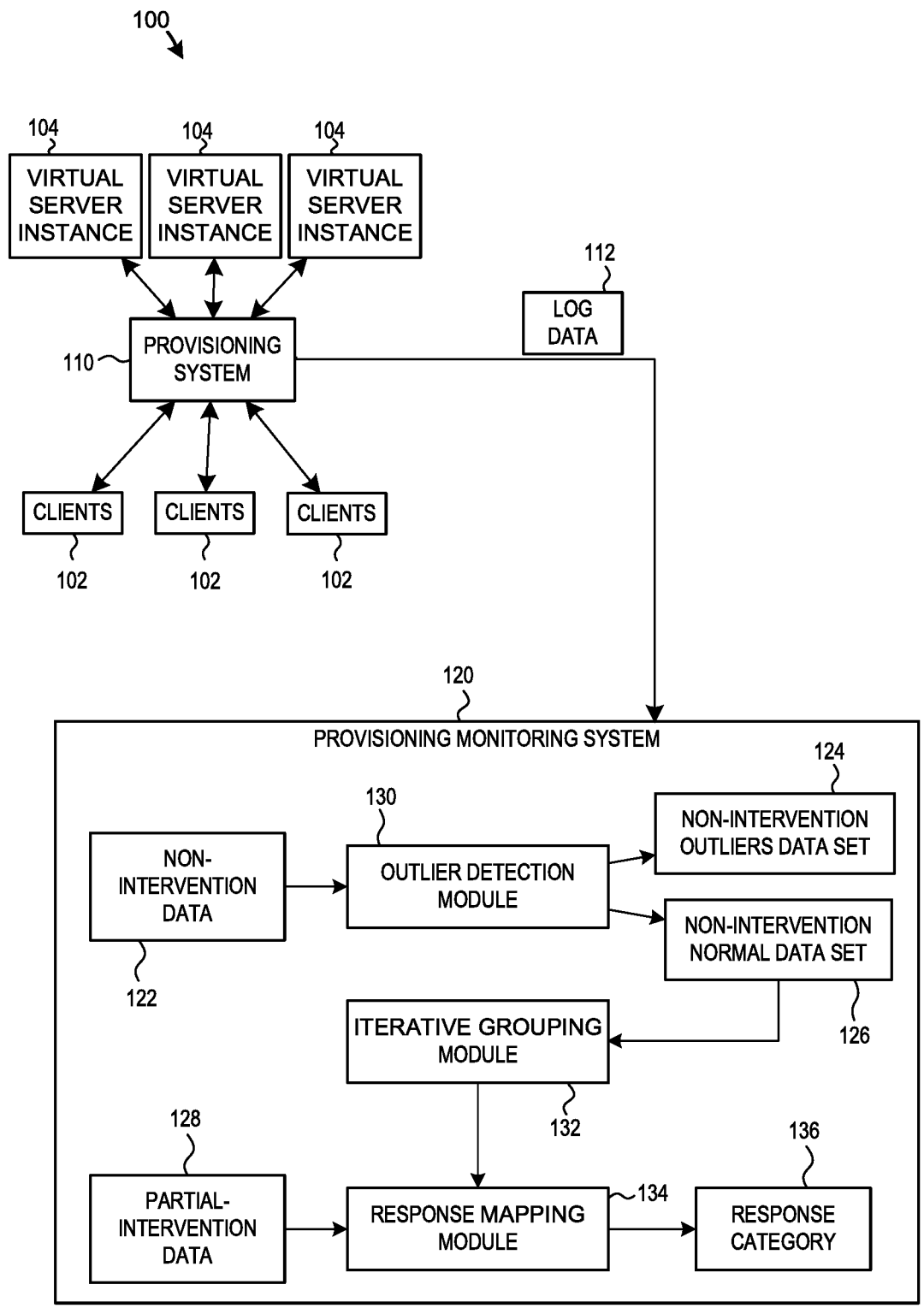
FIG. 1 is a schematic diagram illustrating a system for determining an intervention response category for provisioning workflows in accordance with an embodiment of the present disclosure.

FIG. 1 is a schematic diagram illustrating a system 100 for determining an intervention response category for provisioning workflows in accordance with an embodiment of the present disclosure. The system 100 includes a provisioning system 110 to communicate with one or more clients 102 for the provisioning of one or more virtual server instance (VSI) 104. Alternatively, the disclosed embodiments can provision any of a variety of computing resources, including, but not limited to, a bare metal server or a VSI. For example, the clients 102 may request the provisioning system 110 to provision a VSI or baremetal server in the cloud. In an embodiment, the provisioning system 110 may provision a VSI or baremetal server in the cloud thousands of times a day. Each of the provisions can involve hundreds of steps during which unstructured, timestamped logs are generated as the workflow progresses through the provisioning steps and reflects the provisioning status. During the provisioning process, a provision may become stuck (i.e., unable to advance or complete) during one or more of the provisioning steps. The log data 112 can include various types of error messages, which are indicative of potential causes for a stuck provision, some of which could be fatal errors.

Normal provisioning behavior occurs when a provision completes without getting stuck in any provisioning step and hence without needing any form of intervention. In practice, there is a lack of labels associated with provisions to characterize normal behavior. Human effort towards labeling of such provisions is not easy due to the volume of provisions (e.g., 50 thousand provisions per day). On the other hand, existing anomaly detection methods such as those based on event log frequency counts, do not provide any guidance on when or whether to intervene if an error occurs. Provisions may take longer than normal times to complete; however, not all overdue transactions require manual attention because of their ability to self-resolve.

To improve upon the existing methods, the present disclosure uses historic knowledge of provisions where intervention occurred and where intervention did not occur to categorize provisions based on their errors into a response category that will indicate whether and when to intervene with a provision. The disclosed embodiments provide a high business value by reducing cost, human labor, and mean-time-to-detection, which in turn improves mean-time-to-resolution and customer satisfaction.

In particular, with reference to FIG. 1, a provisioning monitoring system 120 obtains the log data 112. The term log data may include data that is provided in a variety of ways, e.g., from a database store or from event logs. Using historical knowledge of non-intervention data and intervention data, the provisioning monitoring system 120 provides a response category that will indicate whether and when to intervene with a provision. In an embodiment, the provisioning monitoring system 120 includes an outlier detection module 130, an iterative grouping module 132, and a response mapping module 134. The outlier detection module 130 receives as input non-intervention data 122. The non-intervention data 122 is training data for which there is no recorded intervention by humans or system. Provisions could have no recorded intervention for several reasons including they did not get stuck in any provisioning step (considered as normal behavior), or they are stuck provisions, but there is a lack of resources for timely attention (considered as outliers), or the underlying problem is being addressed in a related, yet different provision (also considered as outliers). As further described below, the outlier detection module 130 partitions the non-intervention provision data 122 into two groups—non-intervention normally behaved provisions and outlier provisions. In an embodiment, the outlier detection module 130 generates a non-intervention outliers data set 124 and non-intervention normal data set 126 using a local outlier factor (LOF) conditioned on skewness. LOF is based on a concept of a local density, where locality is given by nearest neighbors. The non-intervention normal data set 126 is the non-intervention data 122 with outliers removed. The iterative grouping module 132 takes as input the non-intervention normal data set 126. The iterative grouping module 132 performs grouping of the non-intervention normal data set 126 for determining error significance and computing duration thresholds for various combinations of values of significant variables of a provision. As described herein, the terms 'cluster' and 'group', 'clustering' and 'grouping' and 'sub-cluster' and 'subgroup' are used interchangeably. The response mapping module 134 uses the error significance determined in iterative grouping module 132, optionally the duration threshold results of iterative grouping, and the presence of errors in the non-intervention normal data 126 and partial intervention data 128 to categorize the provisions into a response category 136. Partial intervention data 128 is training data for which there is knowledge of intervention by humans or system. The term "partial" is used to denote that the partial intervention data 128 may not contain all provisions that would have benefitted from intervention. For example, because of the large number of provisions that occur, not all stuck provisions can be addressed by a limited number of cloud operations personnel. This method would work as intended with complete intervention data, if present. In an embodiment, the response category 136 is one of immediate attention, delayed attention (i.e., giving time for the stuck provision to self-resolve), or no attention.

Figure 2:
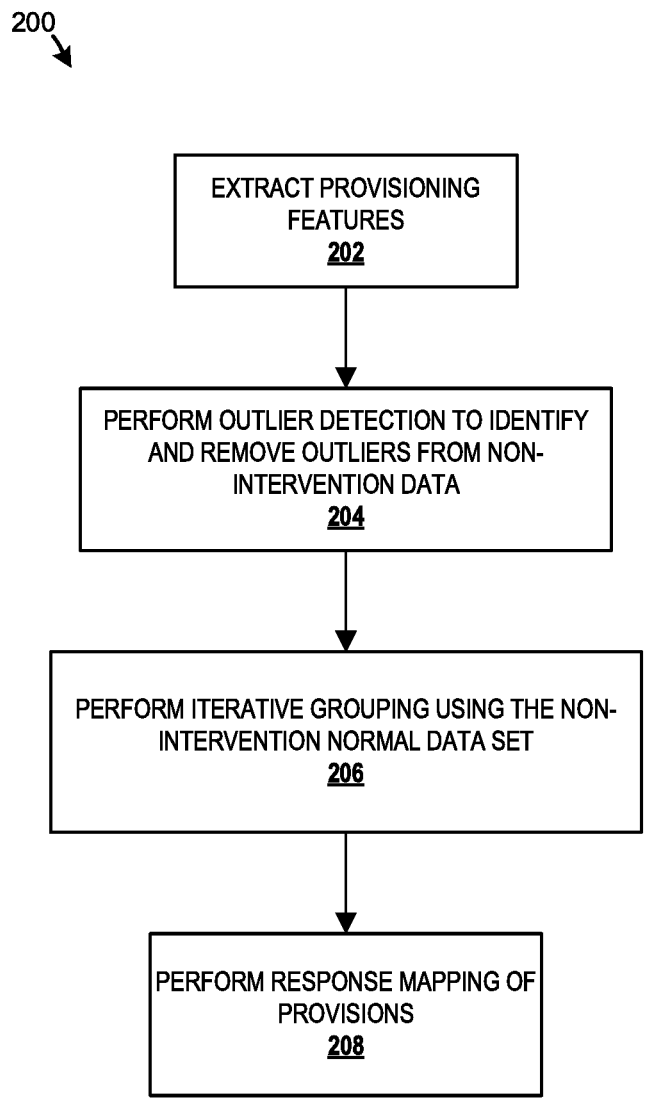
FIG. 2 is a flowchart illustrating a method for determining an intervention response category for provisioning workflows in accordance with an embodiment of the present disclosure.

FIG. 2 is a flowchart diagram illustrating a method 200 for determining an intervention response category for provisioning workflows in accordance with an embodiment of the present disclosure. The method 200 may be executed by a system such as, but not limited to, the provisioning monitoring system 120 in FIG. 1. Provisions are normally broken into individual steps, for example first an available host is located, then the network is configured and then storage is configured. The method described can be applied to one step at a time, or to groups of steps at once. At its largest the group of steps can be the entire provision.

For every provision that occurred in a given time window, the method 200 begins at step 202 by extracting provision specific features from a set of event logs such as the log data 112 in FIG. 1. The term "log data" is used to refer to data from a variety of sources, potentially including data stored in a database. As shown in FIG. 3, an embodiment of the provisioning features includes provision parameters 306. Additional features specific to a provision in a provision step include computed step duration ($st_i$) 304 and templated errors 308 associated with a provisioning step. In an embodiment, the method 200 determines for every provision with unique identifier $PID_i$ in a provision step, the step duration ($st_i$) 304 by identifying the timestamp of message or event in the event logs that indicate the beginning of the provisioning step ($t_{start_i}$) and timestamp of message or event that indicates the end of the provisioning step ($t_{stop_i}$). The method 200 computes the step duration 304 as $st_i=(t_{stop_i}-t_{start_i})$. As part of step 202, the method 200 determines the values of various provision parameters 306 associated with the provision. In an embodiment, the provision parameters 306 are user-specified. Non-limiting examples of provision parameters 306 can include operating system (OS) type, disk capacity, number of central processing units (CPUs), and random-access memory (RAM) size as shown in the chart in FIG. 3. Additionally, as part of step 202, the method 200 also identifies error messages in the event logs that occur during the step, for the provision with unique identifier $PID_i$. The event logs may contain numerous error messages for the provision in a provisioning step. Additionally, a normal provision that did not require intervention may also have error messages associated with it in the event logs. For example, an error message may indicate that a certain connection failed to open in the first few tries, but did not cause the provisioning to halt. The error messages may have some provision-specific details like the internet protocol (IP) address, device ID information, or other information specific to a particular provision. Towards designing analytic solutions for the analysis of errors, the errors are aggregated using the method 200 by removing the provision specific information from the error messages to create the templated errors 308. In an embodiment, the method 200 characterizes a provision data point ($d_i$) as $d_i:\{PID_i, provisionParameters_i, templatedError_i, encodedError_i, st_i\}$. The templated errors are additionally mapped to unique numbers. This process is known as encoding and results in the encoded error values. The encoded error values can be numbers such as 0, 1, 2, etc., where each number maps to a unique templated error. The specific case where provisions have no errors associated with them in a given step is also given unique encoded error value corresponding to "no error". In an embodiment, each provision (in any given step) is associated with no error or 1 error. Note that an "error" can be defined as comprising a single error message or a set of error messages. Each "error" corresponds to a unique combination of (templated) error messages being present. Other non-numeric provision parameters are converted into corresponding encoded values in a similar manner. For example, if the set of values that the provision parameter 'OS_type' can take is {'ubuntu', 'windows', 'centos'}, then the encoded_os_type values would be {0, 1, 2}, where 0 maps to 'ubuntu', 1 maps to 'windows', and so on. It may be noted that such a mapping does not impose any ordering on the variable.

Figure 4:
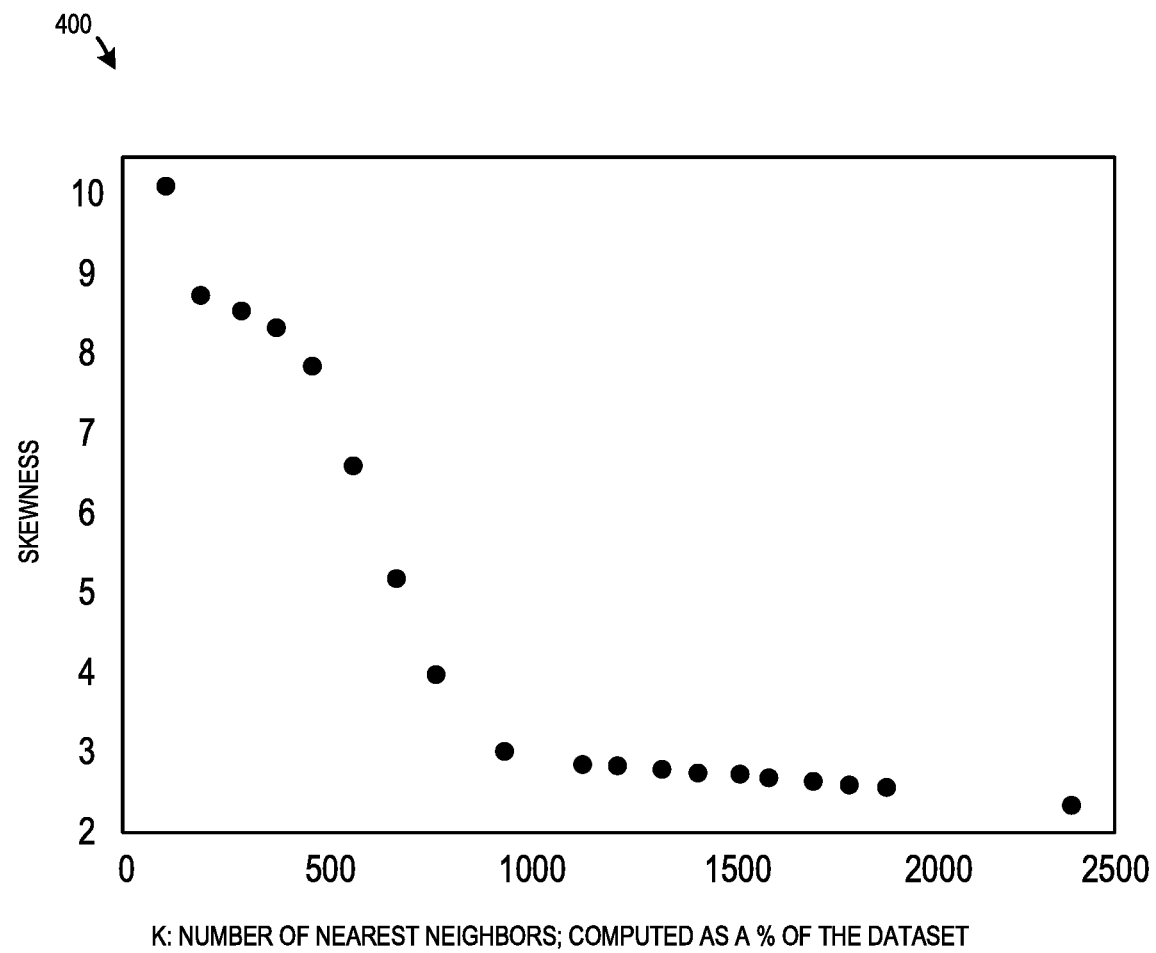
FIG. 4 is graph that plots skewness against number of nearest neighbors (k) in accordance with an embodiment of the present disclosure.
Figure 5:
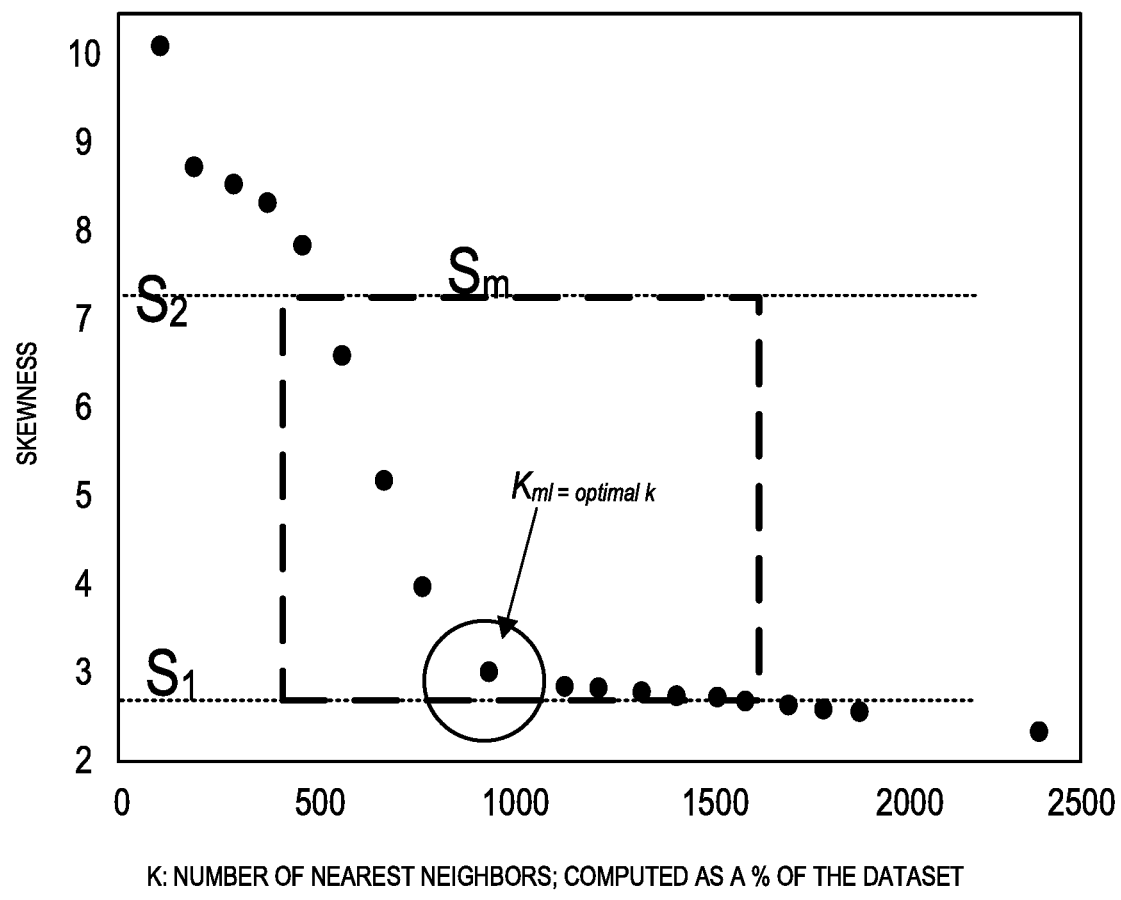
FIG. 5 is graph that illustrates a subset of the skewness set in accordance with an embodiment of the present disclosure.
Figure 6:
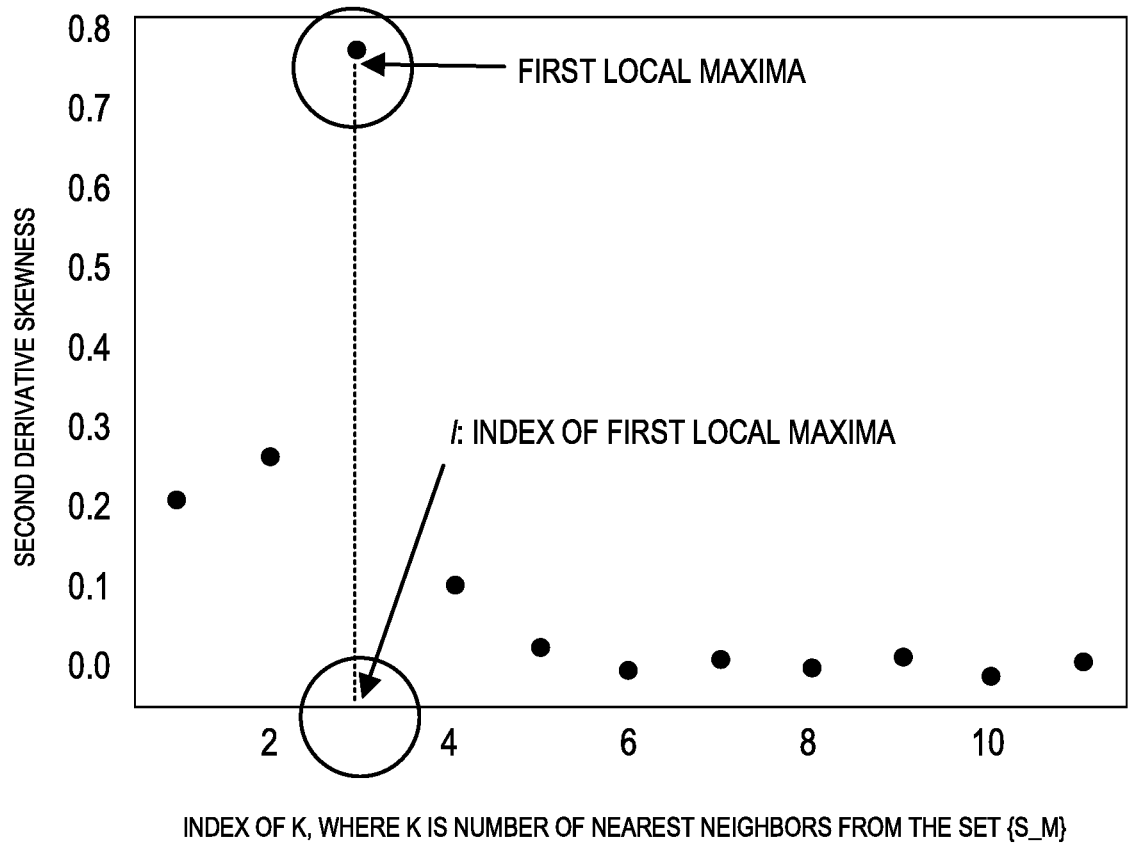
FIG. 6 is graph that illustrates a first local maxima/minima in accordance with an embodiment of the present disclosure.

The method 200 at step 204 performs outlier detection to identify and remove outliers from non-intervention data to produce two disjoint sets: a non-intervention normal data set and a non-intervention outliers data set. The method 200 improves upon the Local Outlier Factor (LOF) technique for outlier detection. LOF is based on a concept of a local density. By comparing the local density of a point to the local densities of its k nearest neighbors, the method 200 can identify regions of similar/high/low density than their neighbors. Distance metrics such as manhattan distance can be used to measure the distance between two points. In an embodiment, LOF is computed on the step durations corresponding to the provisions in the non-intervention set, for a given provision step, conditioned on the skewness. LOF partitions the data into two sets for a pre-determined value of k, where k is a number of nearest neighbors. In method 200, different values of k are considered. In one embodiment, k can be chosen as a % of the dataset. The non-intervention dataset can be represented as $g=\{d_i\}$, where $d_i$ is a provision datapoint whose provision step duration is given by $st_i$ 304. The method 200 can enumerate values of k as $K=\{(j/100)*N\}$, where j is a percentage % of the dataset size, and N is the number of datapoints in g. The method 200 iterates for $k_j \in K$, the following steps: (1) compute the LOF for every datapoint $d_i$, given g and where distance metric=manhattan; (2) compute outlier dataset $g_o^j=\{d_o$ where $d_o$ [step_duration]>t2, $LOF[d_o]>t\}$ where t2 is a preset-threshold for step_duration, t is a threshold that represents, for example, a near gaussian distribution among the datapoints; (3) compute trimmed normal dataset $g_t^j=\{d_t$ s. t $d_t \notin g_o^j\}$, $g_o^j \cap g_t^j=\emptyset$; and (4) compute skewness for the trimmed normal data $s_j$=skewness($g_t^j$). An example graph 400 that plots skewness against various values of k, from 0 to 2500, in accordance with an embodiment of the present disclosure is shown in FIG. 4. The computed skewness value $s_j$ is used to create a set S. Given the skewness set $S=\{s_j\}$ and nearest neighbor values $K=\{k_j\}$, the method 200 determines a subset $\{s_m\}$ from S such that $S_1>s_m>S_2$ as shown in FIG. 5. $S_1$ and $S_2$ are skewness thresholds to capture the self-resolution capability of provisions. Self-resolution capability is when the provision moves out of a stuck state, without requiring any human intervention. The method 200 computes a first local maxima/minima by evaluating the second order difference over the skewness subset $\{s_m\}$ as shown in FIG. 6. In an embodiment, the method 200 employs an approximation algorithm to determine an optimal k. An approximation of optimal k is given by $k_{ml}$, where l is the index of the first local maxima/minima, i.e., the maxima/ minima over the set of second derivative of skewness values in $\{s_m\}$, as shown in FIG. 6. The method 200 partitions the non-intervention data into a non-intervention normal data set and a non-intervention outliers data set by running the LOF for the $k=k_{ml}$.

The method 200 at step 206 performs iterative grouping using the non-intervention normal data set. Unsupervised learning methods look for patterns in the data and cluster the data using features. This class of learning methods does not require any labels and hence no user aid is needed for the purposes of clustering. In an embodiment, the method 200 in step 206 performs iterative grouping using the non-intervention normal data set based on the method 700 illustrated in the flowchart in FIG. 7 as described below.

After the iterative grouping process, the method 200 at step 208 performs a response mapping of provisions using the significance of errors as determined by iterative grouping, optionally, the duration threshold results of the iterative grouping, and the presence of errors in the non-intervention normal data and partial intervention data to categorize the provisions into a response category. The main idea behind response mapping is to find a mapping function that maps the input features to a set of output labels. The set of input features of relevance here is the error messages. The set of output labels is the response categories namely, no attention, immediate attention and delayed attention.

For each $error_i$ that is present in a non-intervention normal data set, and is determined to be a significant variable in any iteration of step 704, as described below, and is also present in the partial intervention data, the Time to Alarm is the maximum duration threshold (TimeToAlarm($error_i$)=maximum(duration threshold$_j$) where maximum(duration threshold$_j$) is the maximum of all duration threshold values across all clusters identified by the iterative grouping process. Note that in accordance with the iterative grouping, each cluster has one error encoding associated with it, where the encoding might represent "no error".

In an embodiment, if an error present in the normal non-intervention data is not determined to be a significant variable, it gets a Time To Alarm of NULL and a "no attention" label independent of whether or not it is present in the partial intervention data. This is particularly appropriate in a case where it is a priority to minimize false positives to decrease operations staff burden. For every error found in the partial intervention data and not in the non-intervention normal data set, the Time To Alarm is 0 (TimeToAlarm($error_k$)=0 because if $error_k$ is in the intervention data and $error_k$ is not present in the non-intervention normal data set it means the error requires immediate attention. For every significant error, where significance is based on the F statistic computation, that is found in the non-intervention normal data set and not in the partial intervention data, the Time to Alarm is NULL (TimeToAlarm($error_k$)=Null,), which means the error does not require attention. Note we assume the data set is large enough that every error is seen in at least one of the normal non-intervention and/or the partial intervention data.

In an embodiment, the response mapping label determined using a Time To Alarm threshold is computed as follows: For each error assigned Time To Alarm of 0, the label is "immediate attention." For each error assigned Time To Alarm of NULL, the label is "no attention." For each error assigned Time To Alarm>0 but not NULL, the label is "delayed attention." An alternative embodiment is where the label is assigned directly based on the characteristics of any error present in the provision step, without necessarily calculating a Time to Alarm. Specifically, for each error determined to be a significant variable in any iteration of step 704 and present in both the normal non-intervention data and partial intervention data, the label is "delayed attention" label. In an embodiment, if an error present in the normal non-intervention data is not determined to be a significant variable, it gets a "no attention" label independent of whether or not it is present in the partial intervention data. For any error that is in the partial intervention data and not the non-intervention normal data, there is an "immediate attention" label associated with it. For any error that is found in the non-intervention normal data set, is determined to be a significant variable in any iteration of step 704, as described below in reference to FIG. 7, and is not found in the partial intervention data, there is a "no attention" label associated with it. Accordingly, individual provisions (in a given provision step) are assigned labels based on their errors, as shown and described below in FIG. 8.

Figure 7:
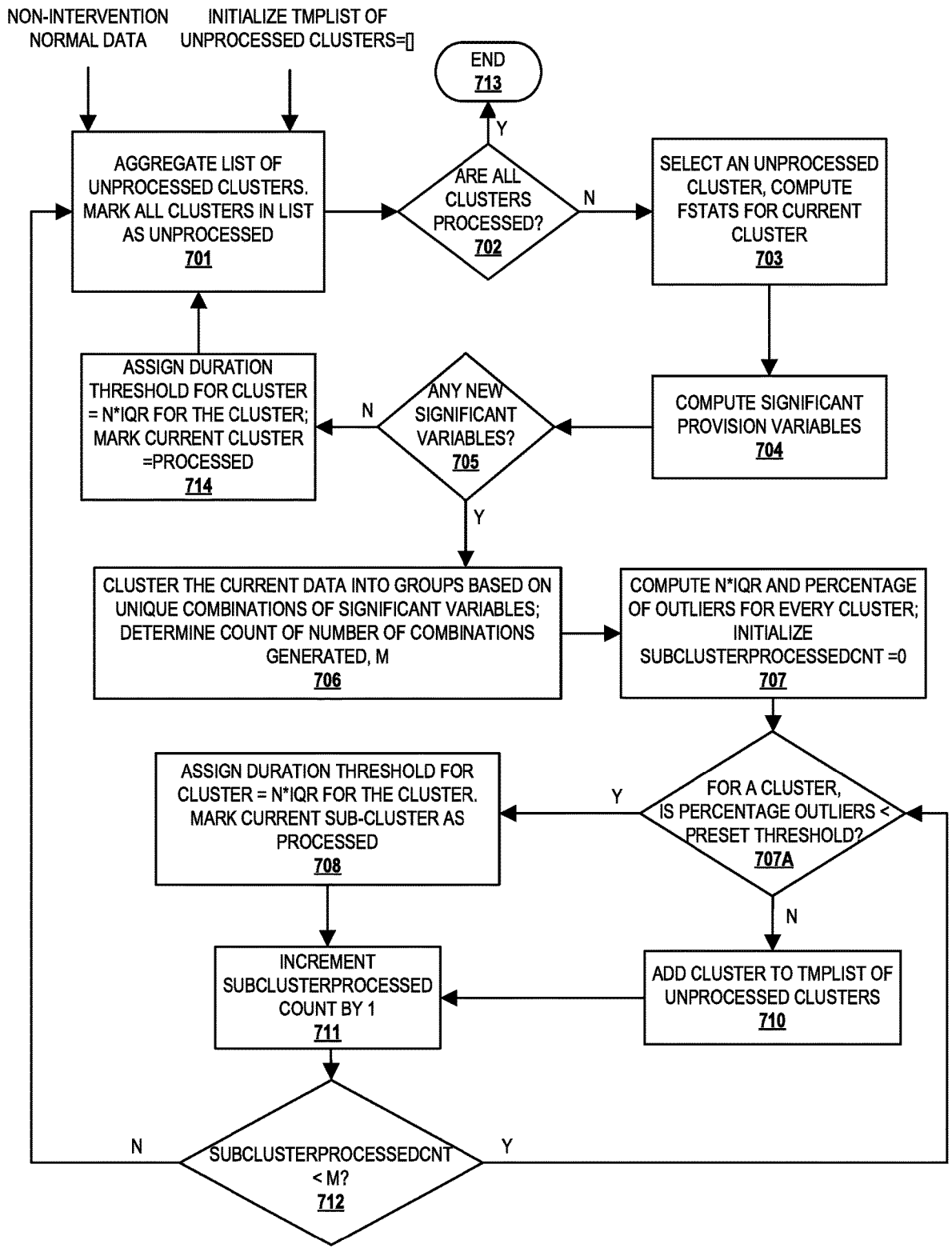
FIG. 7 is a flowchart illustrating a method for performing iterative grouping in accordance with an embodiment of the present disclosure.

FIG. 7 is a flowchart illustrating a method 700 for performing iterative grouping using the non-intervention normal data set in accordance with an embodiment of the present disclosure. The inputs to the method 700 are (a) the non-intervention normal data and (b) a temporary list, say tmpList, of unprocessed clusters (which is initialized to an empty list). The temporary list of unprocessed clusters includes, for each cluster, a list of significant variables associated with it. The list of significant variables associated with each cluster is also initialized to an empty list.

The method 700 begins at step 701 by aggregating a list of unprocessed clusters. At the start of the method, tmpList is populated with the group corresponding to the non-intervention normal data and is the only group present in this list. This group is marked as 'unprocessed.' At this point, there are no significant variables associated with the cluster. At step 702, the method 700 determines whether all clusters in tmpList have been marked as processed. If yes, then method 700 ends at step 713. If all clusters have not been marked as processed, then at step 703, the method 700 selects an unprocessed cluster and computes for the current cluster an analysis of variance F statistic using the provisioning step's provisioning features other than step duration as factor variables and the step duration ($st_i$) 304 as the response variable, ignoring interaction effects. Non-limiting examples of the provisioning features used as factor variables are provisioning parameters 306, which may be encoded, and the encoded error messages 310 as shown in FIG. 3. At the beginning of the processing, the current cluster/group would be the entire non-intervention normal dataset. The F-statistic values are used by the method 700 at step 704 to determine the significant variables that have an influence on the step duration, e.g., by comparing the F-statistic values to a threshold. At step 705, the method 700 determines whether there are any new significant variables for the cluster currently being processed. At the start of processing, the response will be 'Yes' unless there are no variables determined to be significant in step 704.

If, at step 705, there are no additional factor variables remaining or no new significant variables identified for the cluster, the method 700 at step 714 marks the cluster as processed and assigns the value n*IQR, where IQR is the interquartile range and n is a number such as 1, 1.5, 2, or 3, etc. as the cluster's duration threshold, and returns to step 701.

If, at step 705, there are new significant variables, the method 700 at step 706 clusters the current cluster into a plurality of clusters. Each cluster corresponds to a unique combination of values of the significant variables. The total number of unique combinations of values of significant variables (say M) is also determined in step 706. For each cluster in the plurality of M clusters, the method 700, at step 707, computes n*inter quartile range (IQR), where n is a variable, (e.g., 6*IQR), and the percentage of data points whose step duration is greater than n*IQR, say P_o. IQR is computed as the difference between the 75th percentile and the 25th percentile of a set of step duration values in the identified cluster. Furthermore, since each of the plurality of clusters needs to be examined to determine whether its corresponding P_o is less than a preset threshold, a count of number of subclusters processed thus far is maintained (given by subclusterProcessedCnt) and initialized to 0. The method 700, at step 707A, compares for a sub cluster obtained using step 706, the percentage of data points whose step duration is greater than n*IQR (P_o), to a preset threshold. If P_o is less than the preset threshold, then the method 700, at step 708, assigns the computed n*IQR in step 707 as the duration threshold for the particular combination of significant variables associated with the cluster and marks the cluster as processed. Note that the set of significant variables associated and their values for the cluster are known based on the results of step 704. A list of those significant variables are maintained with each cluster. In step 711, the subclusterProcessedCnt is incremented by 1 to indicate that a cluster has been processed.

The method 700 repeats step 707A and step 708 or step 710 and steps 711 and 712 until all M subclusters (generated in step 706) have been processed. Step 712 checks to see if all subclusters generated by method 700 at step 706 have been processed. If for any subcluster that was generated using step 706, the P_o is greater than a preset threshold as determined at step 707A, then in step 710, that cluster is added to the temporary list of unprocessed clusters, tmpList, along with the significant variables that were used to obtain this cluster. It may be noted that an aggregated set of all such clusters is maintained in step 701. The result of such an iterative grouping approach is a set of clusters, each with its set of significant variables and their values and its computed duration threshold.

FIG. 8 illustrates a chart 800 in which "error" and "image template type" are identified in accordance with an embodiment of the present disclosure. In an embodiment, the "encoded-error" and "encoded image template type" are identified based on the F statistic, determined in the first visit to step 704 in FIG. 7, as being the significant variables. The F statistic is used to identify variables that have an influence on the step duration. In the chart 800, the first 7 of the 8 rows correspond to clusters determined in the iterative grouping step 706. For each cluster, the disclosed embodiments compute n*IQR and assign the value as the duration threshold for the cluster. For each of the 4 encoded error values (0, 1, 2, and 3), the text at the top gives the status of the error encoded by the encoded error value. Specifically, the errors encoded 0 and 3 are present in the partial intervention data and non-intervention normal data and are determined in the iterative grouping procedure to be significant variables. Provisions with such errors would be assigned the label "delayed attention." The error encoded 1 is present in the non-intervention normal data but not the partial intervention data. A provision with such an error would be assigned the label "no attention." The error encoded 2 is present in the partial intervention data-only. A provision with such an error would be assigned a label "immediate attention." The chart 800 also shows the duration threshold for each cluster, computed as n*IQR. In chart 800, during the first visit to step 704, the significant variables are identified as "encoded error" and "encoded image template type." leading to the combination of parameter values as (0,0), (0,1), (1,0), (1,1) (3,0), (3,1) wherein the first value in each of these combinations is "encoded error" and the second value in the parentheses is "encoded image template type". For the (encoded error, encoded_tmplate_type) value corresponding to (3,0), in step 707A, the percentage of outliers are determined to be greater than the preset threshold, therefore, a new significant variable is identified (namely, encoded OS type) for this cluster using steps 703, 704. The cluster is further subdivided into groups based on the unique combination of the 3 significant variables, namely encoded error, encoded_template_type and encoded OS type, leading to the clusters shown in rows 3, 4. Also, in chart 800, the clusters where encoded OS type was not determined to be a significant variable have a NA value in the corresponding cell. The specific rows where encoded OS type is marked NA are 1, 2, 5, 6, and 7. The first cluster corresponds to the combination of the values 0, 0 for the encoded error and the encoded image template type. The cluster's duration threshold is 123.53. The second cluster corresponds to the combination of the values 0, 1 for the encoded error and the encoded image template type. The cluster's duration threshold is 363.5. The third cluster corresponds to the combination of the values 3, 0, 0 for the encoded error, encoded image template type, and the encoded OS type respectively. The cluster's duration threshold is 200.0. The fourth cluster corresponds to the combination of the values 3, 0, 1 for the encoded error, encoded image template type, and the encoded OS type respectively. The cluster's duration threshold is 230.0. The fifth cluster corresponds to the combination of the values 3, 1 for the encoded error and the encoded image template type. The cluster's duration threshold is 185.0. The five clusters generated by the iterative grouping process have their Time to Alarm set to 363.5, which is the maximum duration threshold over all clusters associated with any error that appears in both the non-intervention normal and partial intervention data and is determined to be a significant variable in the iterative grouping procedure. These clusters correspond to the encoded errors 0 and 3, which are present both in the partial intervention data and the non-intervention normal data. This maximum threshold is set as the Time to Alarm for the delayed attention category for errors determined to be significant variables that are present in both the partial intervention data and the non-intervention normal data. Therefore, when a provision having the error encoded 0 or 3 stalls for a period longer than the maximum threshold, a user or system should intervene to address the stuck provision. The last row in chart 800 corresponds to the encoded error 2, which is present in the partial intervention data only. Hence, provisions with encoded error 2 will be labeled "immediate attention." The last row in chart 800 has empty cells corresponding to encoded error, encoded image template type, and the encoded OS type, because this error 2 is not present in the non-intervention data and was not considered as part of the iterative grouping process. As described above, in an embodiment, response labels are assigned without computing a Time to Alarm, based on the error's significant variable determination and appearance in one or both of the partial intervention and non-intervention normal data. In that case, a user may be alerted that a provision possibly needing delayed attention is pending, but a specific time may not be given.

FIG. 9 is a chart 900 that depicts results of training and test data from disjoint time periods in accordance with an embodiment of the present disclosure. Column 902 of the chart 900 lists various provisioning steps such as STEP1, STEP2, STEP3, and STEP4. Column 904 provides the number of provisions that include the respective provisioning step in column 902. Column 906 provides the percentage of true positive rate (i.e., recall). Column 908 provides the percentage of positive predictive value (i.e., precision). True positive rate is measured in terms of the number of true positives and the number of false positives. A provision is a true positive when there is evidence of intervention by humans as well as the response classification is of "immediate attention" or "delayed" attention. A provision is a false positive when there is no evidence of intervention by humans but the response label is assigned as "immediate attention" or "delayed" attention. Likewise, a provision is a true negative when there is no evidence of intervention by humans as well as the response label is assigned as "no attention". A false negative is when the provision is intervened by humans because it is stuck, but the assigned response label is "no attention". As shown in the chart 900, using the disclosed embodiments, there is a high precision and high recall rate, with very few false positives. Accordingly, the disclosed embodiments provide an effective method to predict intervention response provisioning workflows using data logs, guided by the knowledge intervention data.

Figure 10:
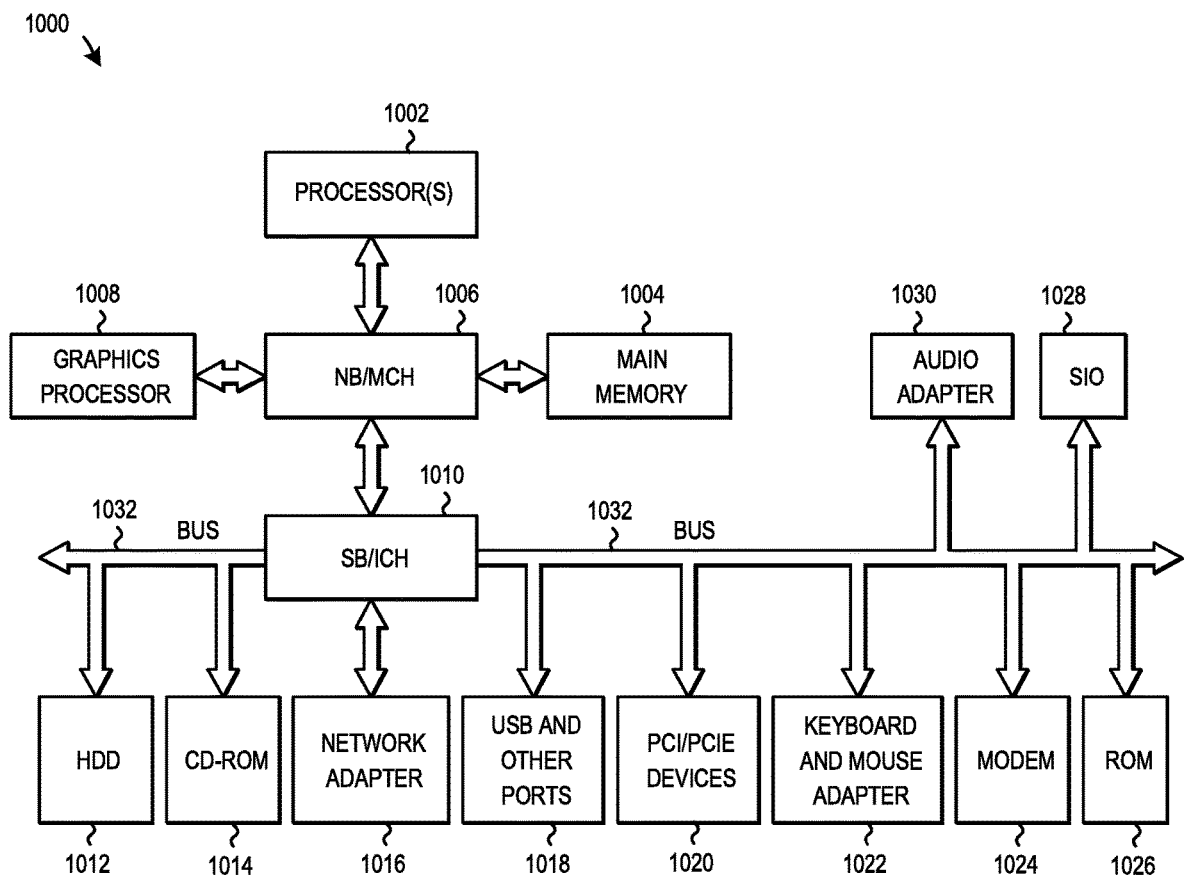
FIG. 10 is a block diagram illustrating a hardware architecture of a system according to an embodiment of the present disclosure in which aspects of the illustrative embodiments may be implemented.

FIG. 10 is a block diagram illustrating a hardware architecture of a system 1000 according to an embodiment of the present disclosure in which aspects of the illustrative embodiments may be implemented. For example, the data processing system 1000 may be configured to store and execute instructions for performing the process described in FIG. 1, FIG. 2, and FIG. 7. In the depicted example, the data processing system 1000 employs a hub architecture including north bridge and memory controller hub (NB/MCH) 1006 and south bridge and input/output (I/O) controller hub (SB/ICH) 1010. Processor(s) 1002, main memory 1004, and graphics processor 1008 are connected to NB/MCH 1006. Graphics processor 1008 may be connected to NB/MCH 1006 through an accelerated graphics port (AGP). A computer bus, such as bus 1032 or bus 1034, may be implemented using any type of communication fabric or architecture that provides for a transfer of data between different components or devices attached to the fabric or architecture.

In the depicted example, network adapter 1016 connects to SB/ICH 1010. Audio adapter 1030, keyboard and mouse adapter 1022, modem 1024, read-only memory (ROM) 1026, hard disk drive (HDD) 1012, compact disk read-only memory (CD-ROM) drive 1014, universal serial bus (USB) ports and other communication ports 1018, and peripheral component interconnect/peripheral component interconnect express (PCI/PCIe) devices 1020 connect to SB/ICH 1010 through bus 1032 and bus 1034. PCI/PCIe devices may include, for example, Ethernet adapters, add-in cards, and personal computing (PC) cards for notebook computers. PCI uses a card bus controller, while PCIe does not. ROM 1026 may be, for example, a flash basic input/output system (BIOS). Modem 1024 or network adapter 1016 may be used to transmit and receive data over a network.

HDD 1012 and CD-ROM drive 1014 connect to SB/ICH 1010 through bus 1034. HDD 1012 and CD-ROM drive 1014 may use, for example, an integrated drive electronics (IDE) or serial advanced technology attachment (SATA) interface. In some embodiments, HDD 1012 may be replaced by other forms of data storage devices including, but not limited to, solid-state drives (SSDs). A super I/O (SIO) device 1028 may be connected to SB/ICH 1010. SIO device 1028 may be a chip on the motherboard configured to assist in performing less demanding controller functions for the SB/ICH 1010 such as controlling a printer port, controlling a fan, and/or controlling the small light emitting diodes (LEDS) of the data processing system 1000.

The data processing system 1000 may include a single processor 1002 or may include a plurality of processors 1002. Additionally, processor(s) 1002 may have multiple cores. For example, in one embodiment, data processing system 1000 may employ a large number of processors 1002 that include hundreds or thousands of processor cores. In some embodiments, the processors 1002 may be configured to perform a set of coordinated computations in parallel.

An operating system is executed on the data processing system 1000 using the processor(s) 1002. The operating system coordinates and provides control of various components within the data processing system 1000 in FIG. 10. Various applications and services may run in conjunction with the operating system. Instructions for the operating system, applications, and other data are located on storage devices, such as one or more HDD 1012, and may be loaded into main memory 1004 for execution by processor(s) 1002. In some embodiments, additional instructions or data may be stored on one or more external devices. The processes described herein for the illustrative embodiments may be performed by processor(s) 1002 using computer usable program code, which may be located in a memory such as, for example, main memory 1004, ROM 1026, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

FIG. 10 is a block diagram illustrating a hardware architecture of a system 1000 according to an embodiment of the present disclosure in which aspects of the illustrative embodiments may be implemented. For example, the data processing system 1000 may be configured to store and execute instructions for performing the process described in FIG. 2 and FIG. 3. In the depicted example, the data processing system 1000 employs a hub architecture including north bridge and memory controller hub (NB/MCH) 1006 and south bridge and input/output (I/O) controller hub (SB/ICH) 1010. Processor(s) 1002, main memory 1004, and graphics processor 1008 are connected to NB/MCH 1006. Graphics processor 1008 may be connected to NB/MCH 1006 through an accelerated graphics port (AGP). A computer bus, such as bus 1032 or bus 1034, may be implemented using any type of communication fabric or architecture that provides for a transfer of data between different components or devices attached to the fabric or architecture.

In the depicted example, network adapter 1016 connects to SB/ICH 1010. Audio adapter 1030, keyboard and mouse adapter 1022, modem 1024, read-only memory (ROM) 1026, hard disk drive (HDD) 1012, compact disk read-only memory (CD-ROM) drive 1014, universal serial bus (USB) ports and other communication ports 1018, and peripheral component interconnect/peripheral component interconnect express (PCI/PCIe) devices 1020 connect to SB/ICH 1010 through bus 1032 and bus 1034. PCI/PCIe devices may include, for example, Ethernet adapters, add-in cards, and personal computing (PC) cards for notebook computers. PCI uses a card bus controller, while PCIe does not. ROM 1026 may be, for example, a flash basic input/output system (BIOS). Modem 1024 or network adapter 1016 may be used to transmit and receive data over a network.

HDD 1012 and CD-ROM drive 1014 connect to SB/ICH 1010 through bus 1034. HDD 1012 and CD-ROM drive 1014 may use, for example, an integrated drive electronics (IDE) or serial advanced technology attachment (SATA) interface. In some embodiments, HDD 1012 may be replaced by other forms of data storage devices including, but not limited to, solid-state drives (SSDs). A super I/O (SIO) device 1028 may be connected to SB/ICH 1010. SIO device 1028 may be a chip on the motherboard configured to assist in performing less demanding controller functions for the SB/ICH 1010 such as controlling a printer port, controlling a fan, and/or controlling the small light emitting diodes (LEDS) of the data processing system 1000.

The data processing system 1000 may include a single processor 1002 or may include a plurality of processors 1002. Additionally, processor(s) 1002 may have multiple cores. For example, in one embodiment, data processing system 1000 may employ a large number of processors 1002 that include hundreds or thousands of processor cores. In some embodiments, the processors 1002 may be configured to perform a set of coordinated computations in parallel.

An operating system is executed on the data processing system 1000 using the processor(s) 1002. The operating system coordinates and provides control of various components within the data processing system 1000 in FIG. 10. Various applications and services may run in conjunction with the operating system. Instructions for the operating system, applications, and other data are located on storage devices, such as one or more HDD 1012, and may be loaded into main memory 1004 for execution by processor(s) 1002. In some embodiments, additional instructions or data may be stored on one or more external devices. The processes described herein for the illustrative embodiments may be performed by processor(s) 1002 using computer usable program code, which may be located in a memory such as, for example, main memory 1004, ROM 1026, or in one or more peripheral devices.

What is claimed is:

1. A method for determining an intervention response category for provisioning workflows, the method comprising:
    determining provisioning features of a provisioning step;
    performing outlier detection to identify and remove outliers from non-intervention data to produce a non-intervention normal data set;
    performing iterative grouping on the non-intervention normal data set to determine significant variables in the provisioning features; and
    performing response mapping of provisions using results of the iterative grouping including a significance of errors and a presence of errors in the non-intervention normal data and partial intervention data to categorize the provisions into a response category.

2. The method of claim 1, wherein the response category is one of immediate attention, delayed attention, and no attention.

3. The method of claim 1, wherein the outlier detection uses local outlier factor (LOF) to identify the outliers in the non-intervention data.

4. The method of claim 1, wherein determining provisioning features of a provisioning step comprises:
    computing a step duration for the provisioning step for all the provisions using event logs associated with the provisioning step;
    identifying provisioning parameters of the provisioning step; and
    identifying error messages in the event logs that occur as part of the provisioning step.

5. The method of claim 4, wherein performing the iterative grouping using the non-intervention normal data set comprises:
    computing F statistic values based on the provisioning parameters, the error messages, and the step duration;
    determining significant variables based on the F statistic values; and
    clustering the non-intervention normal data set into a plurality of clusters based on a combination of values of the significant variables.

6. The method of claim 5, wherein a percentage of datapoints exceeding an n*an interquartile range is compared to a threshold for each cluster to determine whether the cluster is a candidate for further splitting, wherein n is variable.

7. The method of claim 5, wherein a duration threshold is computed for each cluster by computing n*an interquartile range for each cluster, wherein n is variable.

8. The method of claim 5, wherein the response category is delayed attention when an error is present in the partial intervention data and in the non-intervention normal data set and the error is a significant variable as a result of iterative grouping.

9. The method of claim 8, where a time to alarm for the error is a maximum of all duration threshold values across all clusters with a non-zero and non-NULL duration threshold.

10. The method of claim 1, wherein the response category is immediate attention when an error is present in the partial intervention data and not in the non-intervention normal data set.

11. The method of claim 1, wherein the response category is no attention when an error is present in the non-intervention normal data set and not in the partial intervention data.

12. A system comprising memory for storing instructions, and a processor configured to execute the instructions to:
    determine provisioning features of a provisioning step;
    perform outlier detection to identify and remove outliers from non-intervention data to produce a non-intervention normal data set;
    perform iterative grouping on the non-intervention normal data set to determine significant variables in the provisioning features; and
    perform response mapping of provisions using results of the iterative grouping including a significance of errors and a presence of errors in the non-intervention normal data and partial intervention data to categorize the provisions into a response category.

13. The system of claim 12, wherein the response category is one of immediate attention, delayed attention, and no attention.

14. The system of claim 12, wherein the processor is further configured to execute the instructions to identify the outliers in the non-intervention data using local outlier factor (LOF).

15. The system of claim 12, wherein the processor is further configured to execute the instructions to:
    compute a step duration for the provisioning step for all the provisions using event logs associated with the provisioning step;
    identify provisioning parameters of the provisioning step; and identify error messages in the event logs that occur as part of the provisioning step.

16. The system of claim 15, wherein the processor is further configured to execute the instructions to:
compute F statistic values based on the provisioning parameters, the error messages, and the step duration;
determine significant variables based on the F statistic values; and
cluster the non-intervention normal data set into a plurality of clusters based on a combination of values of the significant variables.

17. The system of claim 15, wherein a percentage of datapoints exceeding an n*an interquartile range is compared to a threshold for each cluster to determine if the cluster is a candidate for further splitting, wherein n is variable.

18. The system of claim 15, wherein a duration threshold is computed for each cluster by computing n*an interquartile range for each cluster, wherein n is variable.

19. The system of claim 15, wherein the response category is delayed attention when an error is a significant variable as a result of iterative grouping and is present in the partial intervention data and in the non-intervention normal data set, and wherein a time to alarm for the delayed attention is a maximum of all duration threshold values across all clusters with a non-zero and non-NULL duration threshold, the response category is immediate attention when an error is present in the partial intervention data and not in the non-intervention normal data set, and the response category is no attention when an error is present in the non-intervention normal data set and not in the partial intervention data.

20. A computer program product for determining an intervention response category for provisioning workflows, the computer program product comprising a computer readable storage medium having program instructions embodied therewith, the program instructions executable by a processor of a system to cause the system to:
determine provisioning features of a provisioning step;
perform outlier detection to identify and remove outliers from non-intervention data to produce a non-intervention normal data set;
perform iterative grouping on the non-intervention normal data set to determine significant variables in the provisioning features; and
perform response mapping of provisions using results of the iterative grouping including a significance of errors and a presence of errors in the non-intervention normal data and partial intervention data to categorize the provisions into a response category.

* * * * *